United States Patent
Bretschneider et al.

(10) Patent No.: US 12,088,150 B2
(45) Date of Patent: Sep. 10, 2024

(54) VIBRATION DAMPING IN A MACHINE TOOL HAVING MULTIPLE VIBRATION DETECTION

(71) Applicant: Siemens Aktiengesellschaft, Munich (DE)

(72) Inventors: Jochen Bretschneider, Owingen (DE); Uwe Ladra, Erlangen (DE); Elmar Schäfers, Fürth (DE); Torsten Schür, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 397 days.

(21) Appl. No.: 17/442,957

(22) PCT Filed: Mar. 17, 2020

(86) PCT No.: PCT/EP2020/057194
§ 371 (c)(1),
(2) Date: Sep. 24, 2021

(87) PCT Pub. No.: WO2020/193265
PCT Pub. Date: Oct. 1, 2020

(65) Prior Publication Data
US 2022/0190689 A1    Jun. 16, 2022

(30) Foreign Application Priority Data
Mar. 26, 2019 (EP) ..................................... 19165141

(51) Int. Cl.
*B23Q 11/00*       (2006.01)
*G05B 19/404*    (2006.01)
(Continued)

(52) U.S. Cl.
CPC .......... *H02K 11/20* (2016.01); *B23Q 11/0032* (2013.01); *G05B 19/404* (2013.01); *H02K 7/14* (2013.01); *H02K 11/30* (2016.01)

(58) Field of Classification Search
CPC .......... H02K 11/20; H02K 11/30; H02K 7/14; B23Q 11/0032; G05B 19/404
(Continued)

(56) References Cited

U.S. PATENT DOCUMENTS

| 5,816,122 A | 10/1998 | Benning et al. |
| 6,296,093 B1 | 10/2001 | Norris et al. |

(Continued)

FOREIGN PATENT DOCUMENTS

| CN | 1173653 A | 2/1998 |
| CN | 1577200 A | 2/2005 |

(Continued)

OTHER PUBLICATIONS

PCT International Search Report and Written Opinion of International Searching Authority mailed Jan. 7, 2020 corresponding to PCT International Application No. PCT/EP2020/057194 filed Mar. 17, 2020.

*Primary Examiner* — Christopher P Schwartz
(74) *Attorney, Agent, or Firm* — Henry M. Feiereisen LLC (57) ABSTRACT

A machine tool includes a machine control unit to output control signals to drives for machine elements. A tool which machines a workpiece is thereby moved relative to the workpiece in a position-controlled manner. Arranged in a first region of one machine element is an active vibration damper to damp vibration in a second region of the machine elements as the workpiece is machined by the tool. In order to detect the vibration, a first sensor is arranged in the first region of the machine element and a second sensor is (Continued)

arranged on another machine element or in a different region of the one machine element. Actual values detected by the first and second sensors and corresponding target values are supplied to a dual controller which determines on the basis of these values, a resulting manipulated variable for the active vibration damper and actuates the active vibration damper accordingly.

5 Claims, 5 Drawing Sheets

(51) Int. Cl.
    *H02K 7/14*           (2006.01)
    *H02K 11/20*         (2016.01)
    *H02K 11/30*         (2016.01)

(58) Field of Classification Search
    USPC .............. 188/378; 267/136, 137; 700/275;
                                              318/609, 610, 611
    See application file for complete search history.

(56) References Cited

U.S. PATENT DOCUMENTS

| | | | |
|---|---|---|---|
| 6,903,529 B2 * | 6/2005 | Kunzel | G05B 19/404 |
| | | | 318/609 |
| 8,763,771 B2 * | 7/2014 | Ladra | F16F 15/002 |
| | | | 700/275 |
| 2004/0172171 A1 | 9/2004 | Kerner et al. | |
| 2004/0262110 A1 | 12/2004 | Noe | |
| 2013/0085607 A1 | 4/2013 | Ladra et al. | |
| 2013/0204404 A1 | 8/2013 | Kerner | |
| 2013/0238146 A1 | 9/2013 | Vau | |
| 2013/0268226 A1 | 10/2013 | Morfino et al. | |
| 2021/0404530 A1 * | 12/2021 | Bretschneider | B23Q 11/0032 |

FOREIGN PATENT DOCUMENTS

| | | |
|---|---|---|
| CN | 1903568 A | 1/2007 |
| CN | 101702093 A | 5/2010 |
| CN | 102483622 A | 5/2012 |
| CN | 103365246 A | 10/2013 |
| CN | 103372787 A | 10/2013 |
| CN | 103447617 A | 12/2013 |
| CN | 105436981 A | 3/2016 |
| CN | 106903547 A | 6/2017 |
| DE | 102008052058 B3 | 11/2009 |
| EP | 2574820 A1 | 4/2013 |
| EP | 3017911 A1 | 5/2016 |
| EP | 3312690 A1 | 4/2018 |
| EP | 3708297 A1 * | 9/2020 ............... B23Q 7/12 |
| JP | 2005075641 A | 3/2005 |

* cited by examiner

VIBRATION DAMPING IN A MACHINE TOOL HAVING MULTIPLE VIBRATION DETECTION

CROSS-REFERENCES TO RELATED APPLICATIONS

This application Is the U.S. National Stage of International Application No. PCT/EP2020/057194, filed Mar. 17, 2020, which designated the United States and has been published as International Publication No. WO 2020/193265 A1 and which claims the priority of European Patent Application, Serial No. 19165141.3, filed Mar. 26, 2019, pursuant to 35 U.S.C. 119(a)-(d).

BACKGROUND OF THE INVENTION

The present invention is based on a machine tool,
wherein the machine tool has a plurality of machine elements,
wherein the machine elements can be moved relative to one another via drives of the machine tool,
wherein the machine tool has a machine control unit which identifies control signals for the drives and outputs them to the drives in order to move the machine elements of the machine tool relative to one another in a position-controlled manner, such that a tool which machines a workpiece is moved relative to the workpiece in a position-controlled manner,
wherein in order to dampen a vibration occurring during the machining of the workpiece by the tool on at least one of the machine elements at least one active vibration damper is arranged on said machine element,
wherein to detect the vibration to be damped a first sensor is arranged on said machine element,
wherein a first actual value detected by means of the first sensor as well as a first target value are supplied to a controller,
wherein the controller identifies a resulting manipulated variable for the active vibration damper on the basis of the detected first actual value and the first target value and activates the active vibration damper accordingly.

When machine tools are used to machine workpieces, unwanted vibrations can occur. These vibrations, known as juddering by persons skilled in the art, are caused by insufficiently damped natural frequencies of the machine tool in conjunction with process forces occurring during the machining. In order to prevent juddering, the cutting performance can be reduced, for example by reducing the cutting depth or the rate of feed. In individual cases, a reduction in the spindle speed at which the tool is rotated is also effective. Interventions such as these when operating the machine tool generally result in a reduction in productivity and are hence undesired. In the prior art the path often followed is hence actively or passively to damp natural frequencies of the machine in order hi this way not to have to reduce the cutting performance of the machine tool.

To damp the natural frequencies the corresponding active or passive vibration damper is arranged at a suitable location on the machine element, the vibration of which is to be damped. In the case of an active vibration damper a sensor, by means of which the vibration occurring is detected, is also arranged in the vicinity of the active vibration damper.

Ideally the active vibration damper would be arranged directly at the location of the machine element on which the disruptive vibration occurs. However, this location is often not accessible or else access is restricted, such that an arrangement of the active vibration damper at this location is not possible. The active vibration damper is hence generally arranged at a different, more easily accessible location. As a result, the effectiveness and efficiency of the active vibration damper is often limited. The associated control loop, which utilizes the output signal of the sensor mentioned, is however structurally stable.

In a favorable case this procedure results in sufficiently good damping of the vibration at the relevant location. Juddering then no longer occurs. With the quality of the surface of the workpiece the desired accuracy is achieved. In other cases however there still remains an appreciable vibration at the relevant location.

To suppress or damp such vibration that nevertheless occurs, it is possible to increase the reinforcement of the associated control loop. However, this can lead to instability of the control loop. Another possibility is to arrange the sensor not in the vicinity of the active vibration damper, but in the region in which the disruptive vibration occurs. However, this procedure too entails the risk of instability of the control loop. However, with suitable preprocessing of the signal detected by the sensor, stable control can also be achieved here. The preprocessing comprises in particular frequency filtering in a correspondingly parameterized frequency filter. Where necessary, dynamic transmission elements can additionally be present in the control loop to equalize phase displacements.

The publication U.S. Pat. No. 6,296,093 B1 discloses a machine tool having at least one active damper, in which vibrations are detected at multiple locations of the machine by corresponding sensors. The vibration damper is activated on the basis of the sensor signals generated by the sensors.

The publication EP 3 312 690 A1 discloses a vibration damping system for a machine head of a machine tool, in which multiple sensor signals are generated by multiple sensors at different locations of the machine head and are used to calculate an activation function for the vibration damper.

The publication EP 3 017 911 B1 discloses a dynamically stable machine tool having a ram which contains a machine head, multiple sensors for measuring the strength of vibrations and at least two inertial actuators, wherein each actuator generates a force in one of the main bending directions of the ram as a function of the sensor signals generated by the sensors.

EP 2 574 820 A1 discloses a processing machine with an axle drive which can be activated by a control device in accordance with a target traverse movement, wherein the processing machine has a mechanical structure that can be moved by means of the axle drive, an equalization drive acting on an equalizing mass being arranged on said mechanical structure. The equalizing mass can be moved relative to the mechanical structure as a function of different measurement variables by means of a control device.

The object of the present invention is to create a possibility of combining efficient active damping of an undesired vibration with a stable embodiment of the associated control loop.

SUMMARY OF THE INVENTION

The object is achieved by a machine tool as set forth hereinafter. Advantageous embodiments of the machine tool form the subject matter of the dependent claims.

According to the invention, a machine tool is created,
wherein the machine tool has a plurality of machine elements, wherein the machine elements can be moved relative to one another via drives of the machine tool, wherein the machine tool has a machine control unit which identifies control signals for the drives and outputs them to the drives in order to move the machine elements of the machine tool relative to one another in a position-controlled manner, such that a tool which machines a workpiece is moved relative to the workpiece in a position-controlled manner, wherein at least one active vibration damper is arranged in a first region of one of the machine elements to damp a vibration occurring during the machining of the workpiece by the tool in a second region of said machine element, wherein a first sensor is arranged at least in the first region of said machine element to detect the vibration to be damped and a second sensor is arranged on another machine element or in another region of said machine element, in particular in the second region of said machine element, wherein a first actual value detected by means of the first sensor and a second actual value detected by means of the second sensor as well as a first and a second target value are supplied to a dual controller, wherein the dual controller identifies a resulting manipulated variable for the active vibration damper on the basis of the detected first and the detected second actual value and of the first and the second target value and activates the active vibration damper accordingly and wherein the dual controller has a cascaded controller structure.

In the context of the present invention, both the actual values are therefore detected independently of one another by means of sensors different from one another and thus independently of one another. They are thus also independent of one another in the sense that one of the actual values cannot be derived from the other actual value automatically, as is the case for example with a position controller having a subordinate speed controller. In a case such as this, the change in position, in other words the change in one of the actual values, automatically corresponds for example to the speed, i.e. to the other actual value, such that there exists a direct dependency of both the actual values on one another.

It is possible, and should generally also be the aim, for the first target value to have the value zero. Alternatively it is possible for the first target value to be determined by the target or actual values of the drives which move the machine elements relative to one another in a position-controlled manner. For example, the first target value can correspond to an instantaneous acceleration to which the corresponding machine element is to be subjected on the basis of the current activation of the drives. Analogous embodiments can apply for the second target value.

The resulting manipulated variable of the dual controller is preferably a target force. This results in a particularly simple activation of the active vibration damper.

Different embodiments are possible for utilizing both the detected actual values and both the target values.

In one possible embodiment the dual controller identifies a first resulting actual value on the basis of the detected first and the detected second actual value, the dual controller identifies a second resulting actual value on the basis of the detected first and the detected second actual value, the dual controller comprises a first controller to which the first target value and the resulting first actual value are supplied and which identifies a first provisional manipulated variable therefrom, the dual controller comprises a second controller to which the second target value and the resulting second actual value are supplied and which identifies a second provisional manipulated variable therefrom, and the dual controller adds the first and the second resulting manipulated variable and in this way identifies the resulting manipulated variable.

The wording "the dual controller identifies a first resulting actual value on the basis of the detected first and the detected second actual value" is to be understood here in the sense that both the detected first and the detected second actual value are included in the first resulting actual value. The case whereby the first resulting actual value is identified solely on the basis of the detected first actual value or solely on the basis of the detected second actual value should on the contrary be excluded. Analogous embodiments apply for the identification of the second resulting actual value. The way in which the dual controller identifies the first resulting actual value furthermore differs from the way in which the dual controller identifies the second resulting actual value. This is because if this were not the case, the first resulting actual value would always be identical to the second resulting actual value in the course of the identification, such that a dual identification would not be necessary.

In particular, the dual controller can have processing elements and adders, wherein the output signals of the processing elements are supplied to the adders, the first detected actual value and the second detected actual value are supplied to two of the processing elements each, and processing of the respective detected actual value takes place within the processing elements in accordance with a respective transmission function.

The advantage of this embodiment is that it is relatively simple and nevertheless flexible. This is the case in particular when the transmission functions are constants not equal to zero, the dual controller therefore identifies the first and the second resulting actual value as a linear combination of the detected first and the detected second actual value in each case.

Alternatively it is possible for the dual controller to comprise a first controller to which the first target value and the first detected actual value are supplied and which identifies a first provisional manipulated variable therefrom, for the dual controller to comprise a second controller to which the second target value and the second detected actual value are supplied and which identifies a second provisional manipulated variable therefrom, and for the dual controller to add the first and the second resulting manipulated variable and in this way to identify the resulting manipulated variable.

In this case a similar procedure thus takes place, wherein however explicit attention is paid to the case in which the first resulting actual value is equal to the detected first actual value and analogously the second resulting actual value is equal to the detected second actual value.

Supplying both the detected actual values to their respective controllers need not necessarily mean that both the detected actual values are subtracted, as they are, from their respective target values in the controllers and thus a respective control difference is identified. Rather it is possible for both the detected actual values to undergo a respective preprocessing within the respective controller and only then to subtract the respective preprocessed actual value from its respective corresponding target value. However, regardless of the manner of the preprocessing only the respective detected actual value is utilized in the course of the preprocessing, but not the respective other actual value.

In another embodiment, the dual controller comprises a first controller to which the first target value and the first detected actual value are supplied and which identifies a first connection variable therefrom, the dual controller comprises a second controller to which the second target value and the second detected actual value as well as the first connection variable are supplied and which identifies a provisional manipulated variable therefrom, the dual controller has a pilot-control block to which the first target value and the first detected actual value are supplied and which identifies a second connection variable therefrom, and the dual controller connects the second connection variable to the provisional manipulated variable and in this way identifies the resulting manipulated variable.

In this case a cascaded controller structure is set up, in which in the course of commissioning the second controller can first be parameterized, such that it is stable, and then the second controller and the pilot-control block can be parameterized, such that the dual controller is stable in its entirely. Here too, a preprocessing of both the detected actual values is again possible.

This procedure can also be implemented conversely in that the dual controller comprises a first controller to which the first target value, the first detected actual value and a first connection variable are supplied and which identifies a provisional manipulated variable therefrom, the dual controller comprises a second controller to which the second target value and the second detected actual value are supplied and which identifies the first connection variable therefrom, the dual controller has a pilot-control block to which the second target value and the second detected actual value are supplied and which identifies a second connection variable therefrom, and the dual controller connects the second connection variable to the provisional manipulated variable and in this way identifies the resulting manipulated variable.

Here too, a preprocessing of both the detected actual values is again possible.

BRIEF DESCRIPTION OF THE DRAWING

The properties, features and advantages of this invention described above as well as the way in which these are achieved will become clearer and significantly more comprehensible in connection with the following description of the exemplary embodiments, which are explained in greater detail in conjunction with the drawings, in which, shown schematically.

DETAILED DESCRIPTION OF PREFERRED EMBODIMENTS

Figure 1:
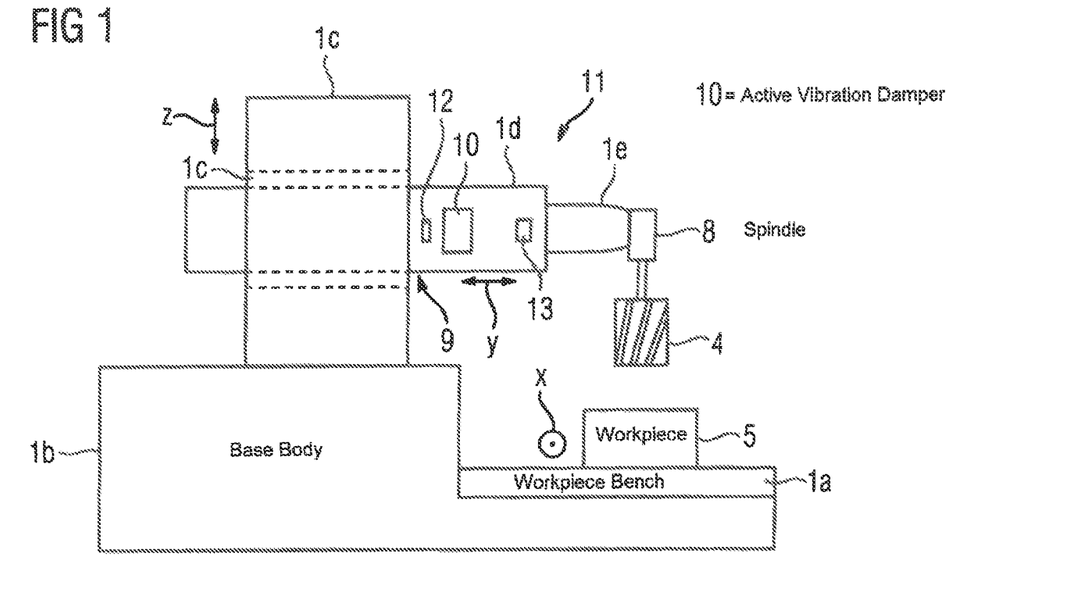
FIG. 1 shows a machine tool from the side.
Figure 2:
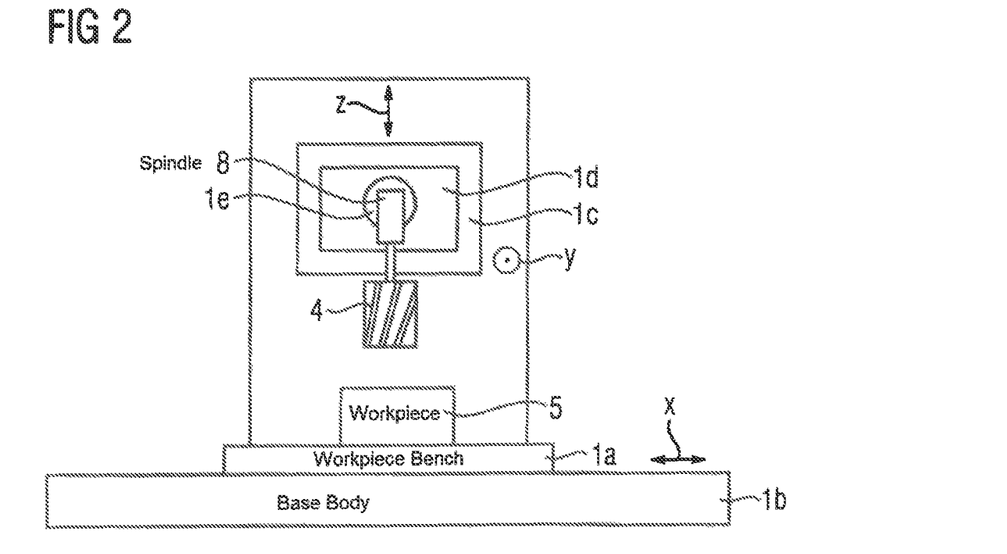
FIG. 2 shows the machine tool from FIG. 1 from the front.

According to FIGS. 1 and 2 a machine tool has a plurality of machine elements 1. The reference characters of the machine elements 1 are supplemented in FIGS. 1 and 2 by a lowercase letter a to e in each case, so that if need be reference can be made below specifically to a particular one of the machine elements 1.

The machine elements 1 can be moved relative to one another via drives 2 of the machine tool. For this purpose, the drives 2 are activated in accordance with the illustration in FIG. 3 by a machine control unit 3 which identifies the respective control signals C or the associated target values S* for the drives 2 and outputs them to the drives 2. Because of the corresponding specification of the control signals C or of the associated target values S* the machine elements 1 are moved by the machine control unit 3 relative to one another in a position-controlled manner. The associated actual values S are fed back to the machine control unit 3 by the drives 2. The travel movement causes a tool 4 to be moved relative to a workpiece 5 in a position-controlled manner. The tool 4 executes a machining of the workpiece 5 at least intermittently during the travel movement, for example milling.

The machine control unit 3 is normally embodied as a numeric controller (CNC). The way in which the machine control unit 3 works is determined by a system program 6 and a utility program 7. The system program 6 generally corresponds to the NC kernel of the numeric controller. The utility program 7 is generally what is known as a parts program.

The machine tool and thus in particular also the machine elements 1 can be embodied as required. FIGS. 1 and 2 show—purely by way of example—a simple embodiment. In this embodiment a workpiece bench 1a is present, to which the workpiece 5 is fastened. The workpiece bench 1a can be moved relative to a base body 1b of the machine tool in a horizontal direction designated by x. A guide frame 1c can furthermore be present in this embodiment, which can be moved relative to the base body 1b in a vertical direction designated by z. In this embodiment a support arm 1d can furthermore be moved in the guide frame 1c in a further horizontal direction designated by y. The further horizontal direction y is generally orthogonal to the aforementioned horizontal direction x. A machining head 1e can be arranged on the support arm 1d, and supports a spindle 8 and the tool 4. The machining head 1e can if appropriate be pivoted about one or two axes.

The mechanical-engineering embodiment of the machine tool just mentioned is possible, and implementations of this type also exist. However, the present invention is not restricted to this embodiment.

Unwanted vibrations may occur on different machine elements 1—for example on the support arm 1d or on the workpiece bench 1a—during the machining of the workpiece 5 by the tool 4. It is assumed below that a vibration occurs on the support arm 1d. However, it could also occur on another of the machine elements 1. Where reference is made below to the machine element 1 on which the vibration occurs, the reference character 1d is hence used. However, this serves only for purposes of explanation and should not be understood as restrictive in the sense that the vibration has to occur on the support arm 1d. Furthermore, the corresponding machine element 1d is designated below as the affected machine element.

At least one active vibration damper 10 is arranged in a first region 9 of the affected machine element 1d. The active vibration damper 10 can for example be embodied as a linear motor. The active vibration damper 10 serves to damp this vibration. In contrast, the vibration as such does not occur in the first region 9, but in a second region 11 of the affected machine element 1d.

A first sensor 12 is arranged in the vicinity of the active vibration damper 10 and thus in the first region 9 of the affected machine element 1d in order to detect the vibration to be damped. A second sensor 13 is furthermore additionally present in order to detect the vibration to be damped. The second sensor 13 can be arranged on another machine element 1, for example on the machining head 1e. It can also be arranged on the affected machine element 1d. In this case the second sensor 13 is however arranged in another region of the affected machine element 1d different from the first region 9. In particular, the second sensor 13 can in this case be arranged in the second region 11 of the affected machine element 1d. Regardless of the specific arrangement of the second sensor 13, the second sensor 13 is however arranged closer than the first sensor 12 to the location at which the tool 4 acts on the workpiece 5. In accordance with the specific example, the second sensor 13 can for example be arranged on the support arm 1d in the vicinity of the machining head 1e or on the machining head 1e itself, but not on the guide frame 1c or on the base body 1b. The sensors 12, 13 can for example be embodied as acceleration sensors.

The active vibration damper 10 is controlled by a dual controller 14. A dual controller 14 is a controller to which two actual values I1, I2 and two target values I1*, I2* are supplied and which identifies a resulting manipulated variable F* on the basis of all four variables I1, I2, I1*, I2* supplied to it. The dual controller 14 is preferably implemented in software. Alternatively the dual controller 14 can be implemented in hardware.

Figure 3:
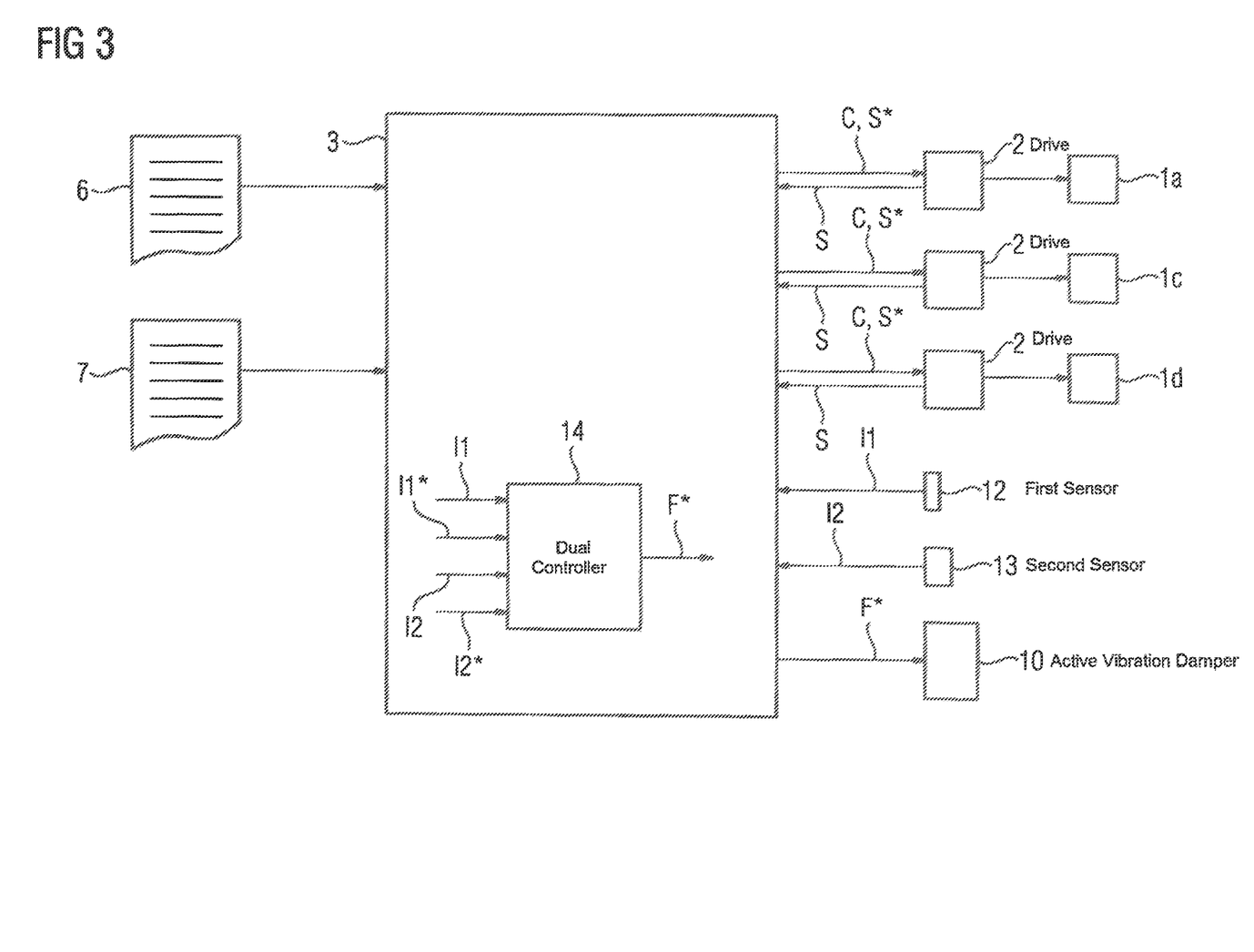
FIG. 3 shows a control-engineering illustration of a machine tool.

In accordance with the illustration in FIG. 3 it is possible for the dual controller 14 to be part of the machine control unit 3. Alternatively it can be implemented autonomously. In particular, so-called control units (not illustrated) are often assigned to the drives 2, and convert the control signals C output by the machine control unit 3 into the activation of power converters (not illustrated), which in turn supply the electrical machines (not illustrated) with their respective operating current, such that the electrical machines move the machine elements 1. The dual controller 14 can in particular be implemented in a control unit of this type. Since furthermore a control unit can often effect the activation of the power converters by multiple electrical machines, it can where appropriate be the same control unit which also supplies the electrical machines of the drives 2 with their respective operating current.

A first actual value I1 and a second actual value I2 are therefore supplied to the dual controller 14. The first actual value I1 is detected by means of the first sensor 12, the second actual value I2 by means of the second sensor 13. Furthermore, a first target value I1* and a second target value I2* are supplied to the dual controller 14. On the basis of the detected first and the detected second actual value I1, I2 and of the first and the second target value I1*, I2* the dual controller 14 identifies a resulting manipulated variable F* for the active vibration damper 10. The dual controller 14 also activates the active vibration damper 10 in accordance with the identified resulting manipulated variable F*. The resulting manipulated variable F* can be a target force, for example. This applies both for the embodiment in principle in accordance with FIG. 3 and for the possible embodiments of this principle explained below.

Figure 4:
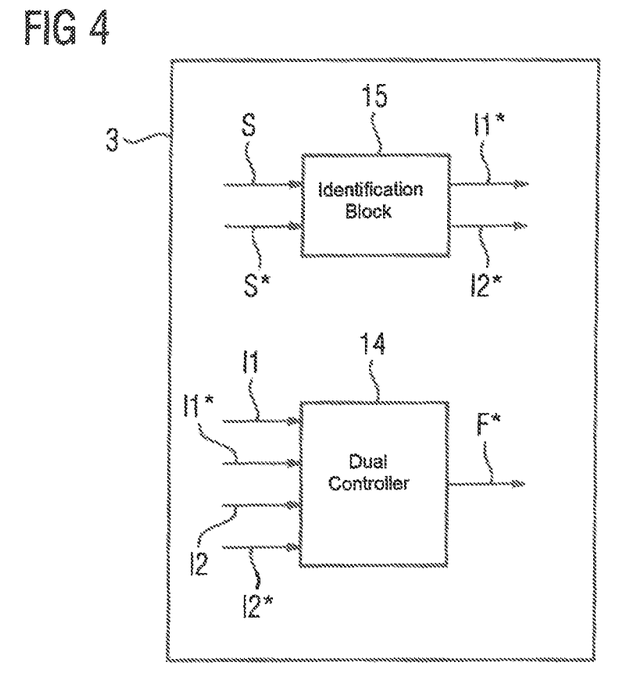
FIG. 4 shows a possible identification of target values.

In connection with the embodiment in accordance with FIG. 3, the first target value I1* and the second target value I2* have the value zero. However, this is not mandatory. Instead, it is alternatively possible for the first target value I1* to have a value in accordance with the illustration in FIG. 4 which is determined by the target or actual values S*, S of the drives 2 which move the machine elements 1 relative to one another in a position-controlled manner. For example, the machine control unit 3 can have an identification block 15 which identifies an expected instantaneous acceleration of the affected machine element 1d in the first region 9 on the basis of the target or actual value S*, S and specifies this value to the dual controller 14 as the first target value I1*. Analogously, in accordance with the illustration in FIG. 4 the identification block 15 can also identify the second target value I2*. In particular, the second target value I2* can also have a value which is determined by the target or actual values S*, S of the drives 2 which move the machine elements 1 relative to one another in a position-controlled manner. For example, the identification block 15 can, on the basis of the target or actual values S*, 5, identify an expected instantaneous acceleration of the location at which the second sensor 13 is arranged, and specify this value to the dual controller 14 as the second target value I2*.

If the first target value I1* is dynamically identified by the machine control unit 3, the second target value I2* is generally also dynamically identified by the machine control unit 3. However, it is also possible for just one of both the target values I1*, I2* to be dynamically identified by the machine control unit 3, while the other one of both the target values I1*, I2* statically has the value zero.

Possible embodiments of the dual controllers 14 are explained below in conjunction with the further figures. In all embodiments the dual controller 14 comprises a first controller 16 and a second controller 17.

Figure 5:
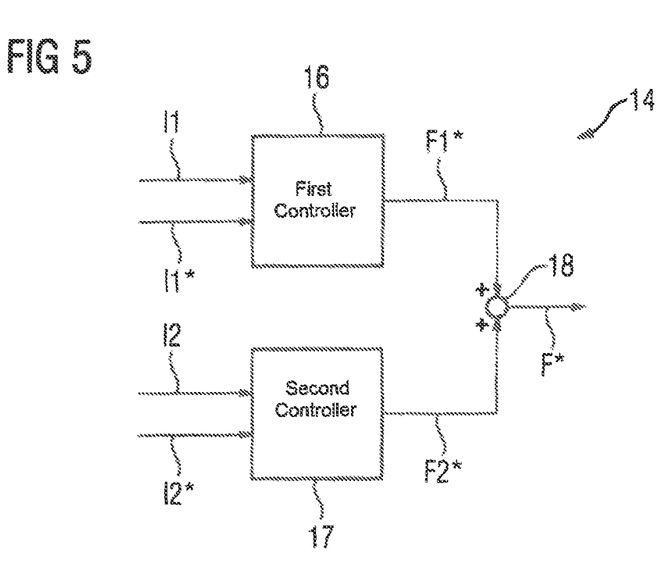
FIGS. 5 to 9 shows possible embodiments of a dual controller.

In the simplest embodiment the two controllers 16, 17 do not influence each other in accordance with the illustration in FIG. 5. The first target value I1* and the first detected actual value I1 are supplied to the first controller 16. The first controller 16 identifies a first provisional manipulated variable F1* therefrom. Analogously, the second target value I2* and the second detected actual value I2 are supplied to the second controller 17. The second controller 17 identifies a second provisional manipulated variable F2* therefrom. Both the provisional manipulated variables F1*, F2* are supplied to an adder 18 which is likewise part of the dual controller 14. The adder 18 adds the first and the second resulting manipulated variable F1*, F2* and in this way identifies the resulting manipulated variable F*. Any kind of preprocessing of the first actual value I1 prior to the subtraction from the first target value I1* is possible, but is not illustrated in FIG. 5. The same applies for the second actual value I2.

Figure 6:
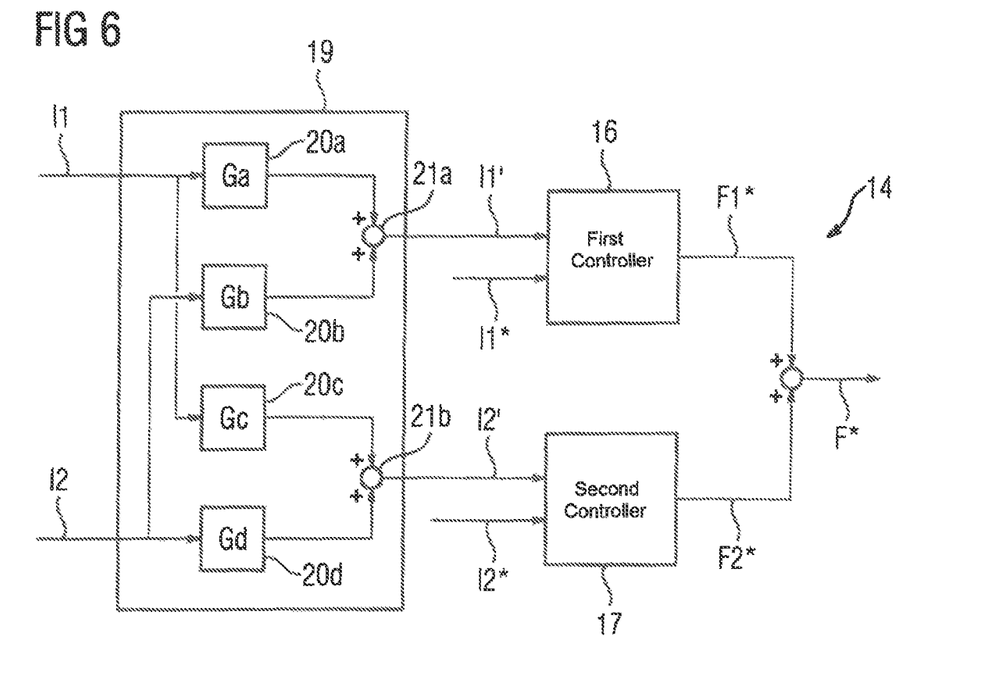

The embodiment in accordance with FIG. 6 is similar to the embodiment in FIG. 5. However, unlike the embodiment in FIG. 5 the detected actual values I1, I2 are not supplied directly to both the controllers 16, 17. Instead, the dual controller 14 additionally has a preprocessing block 19 to which both the detected actual values I1, I2 are supplied. The preprocessing block 19 identifies a first resulting actual value I1' on the basis of the detected first and the detected second actual value I1, I2—thus on the basis of both actual values I1, I2. Likewise the preprocessing block 19 identifies a second resulting actual value I2' on the basis of the detected first and the detected second actual value I1, I2—thus here again on the basis of both actual values I1, I2. Both the resulting actual values I1', I2' are then supplied to the first and the second controller 16, 17.

The way in which the preprocessing block 19 identifies both the resulting actual values I1', I2' can be determined as required. In particular, the preprocessing block 19 can have processing elements 20a to 20d and adders 21a, 21b, wherein the output signals of the processing elements 20a to 20d are supplied to the adders 21a, 21b and the first detected actual value I1 and the second detected actual values I2 are supplied to two of the processing elements 20a to 20d each. In principle any processing of the respective detected actual value I1, I2 can take place within the processing elements 20a to 20d. Each of the processing elements 20a to 20d thus has a respective transmission function Ga to Gd. The respective transmission function Ga to Gd can be a PT1 lowpass filter function, for example. Other filter functions are however also possible. However, the transmission functions Ga to Gd are generally correlated with one another such that the relationships Gb=1−Ga and Gd=1−Gc apply. Furthermore, it is the case for all transmission functions Ga to Gd that they are not identical to zero. Finally it is the case for the transmission functions Ga to Gd that Ga is not equal to Gc and Gb is not equal to Gd.

Figure 7:
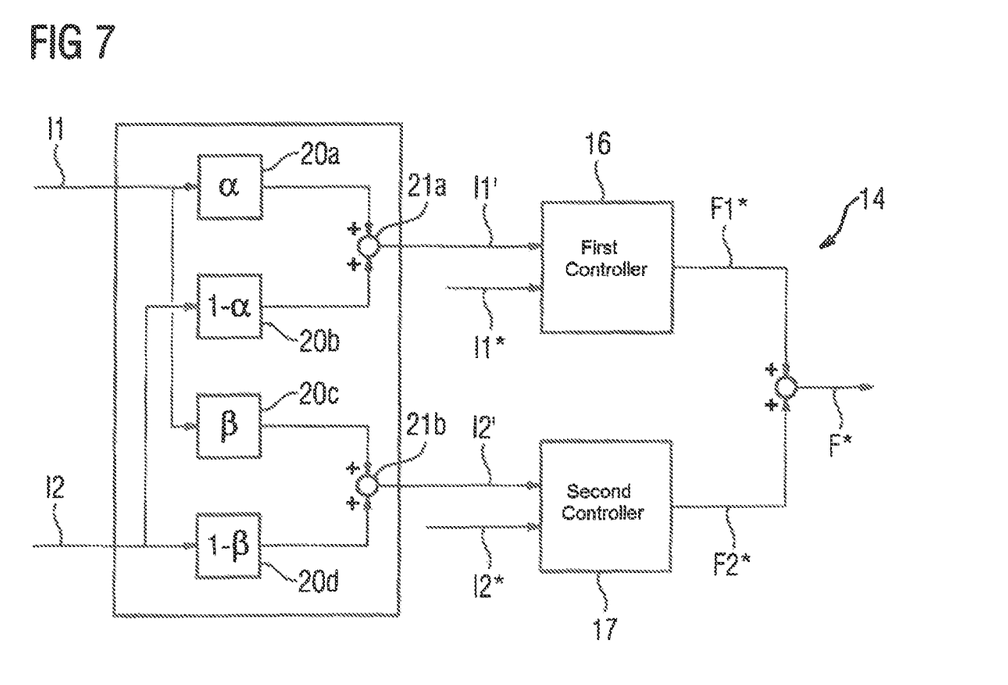

FIG. 7 shows a special case of FIG. 6. According to FIG. 7 the transmission functions Ga to Gd are simple constants α, 1−α, β and 1−β, wherein α, 1−α, β and 1−β are all not equal to zero and furthermore—at least generally—α is not equal to β. Furthermore, the relationships 0<α<1 and 0<β<1 generally apply. In this case the resulting actual values I1', I2' each thus yield a linear combination of the detected first and the detected second actual value I1, I2. For the sake of good order, it may be mentioned that the case (excluded here) α=1, β=0 corresponds to the embodiment in FIG. 5.

In connection with the embodiments according to FIGS. 5 to 7, both the controllers 16, 17 are coequal next to one another and their output signals F1*, F2* are added to form the resulting manipulated variable F*. In connection with the embodiments according to FIGS. 8 and 9, both the controllers 16, 17 are likewise present, but are not coequal next to one another.

Figure 8:
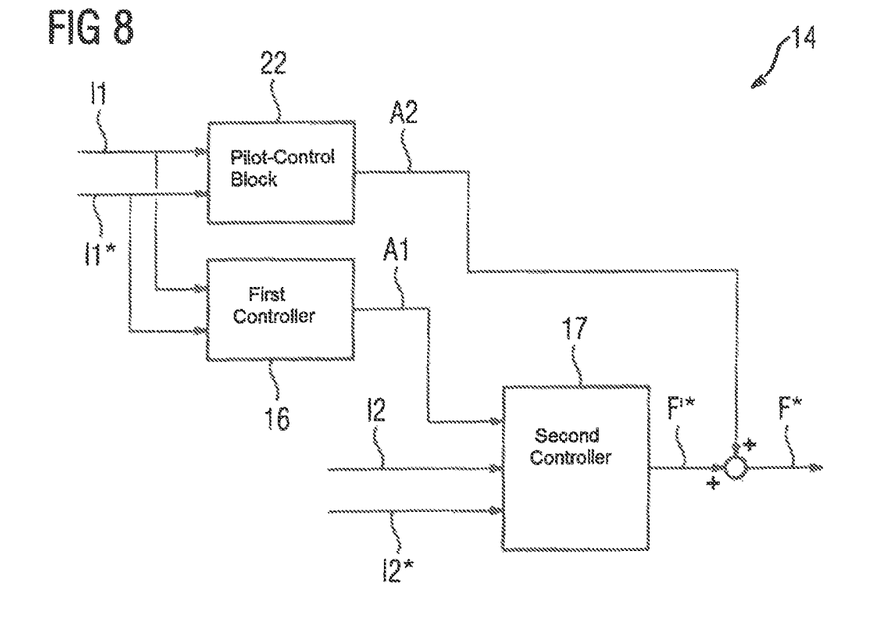

In connection with the embodiment in accordance with FIG. 8 the first target value I1* and the first detected actual value I1 are supplied to the first controller 16. The first controller 16 identifies a first connection variable A1 therefrom. The first controller 16 can for this purpose have a corresponding internal transmission function. The second target value I2* and the second detected actual value I2 and additionally the first connection variable A1 are supplied to the second controller 17. The second controller 17 identifies a provisional manipulated variable F'* therefrom. The dual controller 14 furthermore has a pilot-control block 22. The first target value I1* and the first detected actual value I1, in particular their difference, are supplied to the pilot-control block 22. The pilot-control block 22 identifies a second connection variable A2 therefrom. The dual controller 14 connects the second connection variable A2 to the provisional manipulated variable F*. The sum of both these variables A2, F'* identified in this way corresponds to the resulting manipulated variable F*.

Figure 9:
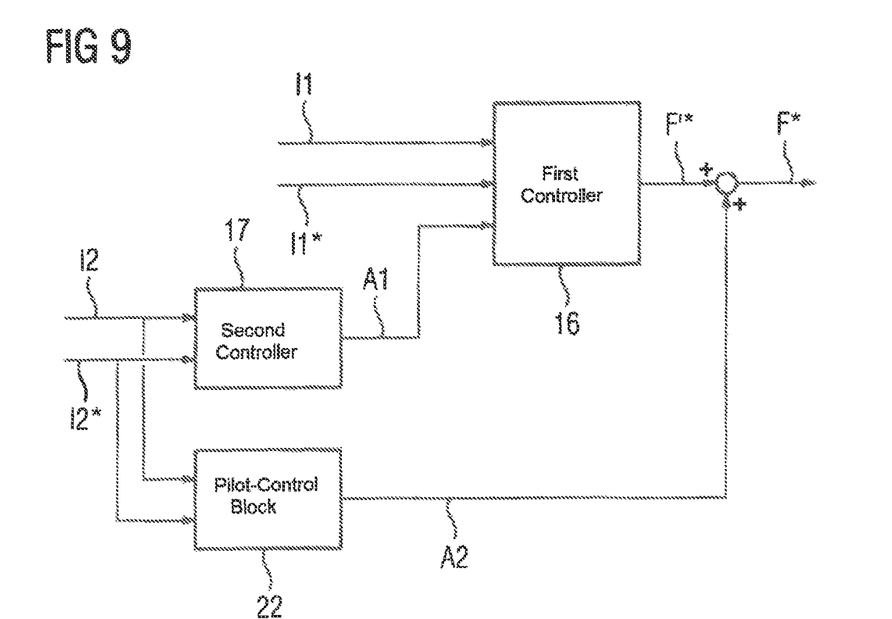

In connection with the embodiment in accordance with FIG. 9, a fully analogous procedure is employed. The only difference is that the first and the second controller 16, 17 swap roles. In connection with the embodiment in accordance with FIG. 9 the first target value I1*, the first detected actual value I1 and a first connection variable A1 are thus supplied to the first controller 16. The first controller 16 identifies a provisional manipulated variable F'* therefrom. The second target value I2* and the second detected actual value I2 are supplied to the second controller 17. The second controller 17 identifies the first connection variable A1 therefrom. Also in the case of the embodiment in accordance with FIG. 9 the dual controller 14 has a pilot-control block 22. The second target value I2* and the second detected actual value I2, in particular their difference, are supplied to the pilot-control block 22. The pilot-control block 22 identifies a second connection variable A2 therefrom. The dual controller 14 connects the second connection variable A2 to the provisional manipulated variable F*. The sum of both these variables A2, F* identified in this way corresponds to the resulting manipulated variable F*.

In summary, the present invention thus relates to the following facts:

Machine elements 1 of a machine tool can be moved relative to one another via drives 2. A machine control unit 3 of the machine tool identifies control signals C for the drives 2 and outputs them to the drives 2. As a result, a tool 4 which machines a workpiece 5 is moved relative to the workpiece 5 in a position-controlled manner. At least one active vibration damper 10 is arranged in a first region 9 of a machine element 1d in order to damp a vibration which occurs during the machining of the workpiece 5 by the tool 4 in a second region 11 of said machine element 1d. In order to detect the vibration a first sensor 12 is arranged at least in the first region 9 of said machine element 1d, and a second sensor 13 on another machine element 1e or in another region of said machine element 1d. Actual values I1, I2 detected by means of the first and the second sensor 12, 13 and corresponding target values I1*, I2* are supplied to a dual controller 14. The dual controller 14 identifies a resulting manipulated variable F* for the active vibration damper 10 on the basis of said values I1, I2, I1*, I2* and activates the active vibration damper 10 accordingly.

The present invention has many advantages. Because of the arrangement of the first sensor 12 in the vicinity of the active vibration damper 10 and thus the detection of the first actual value I1 in the vicinity of the active vibration damper 10, stable control can automatically be implemented, and is easily improved by being supplemented by the second actual value I2. The second sensor 13 can be arranged at any location, in particular in the vicinity of the TCP (=tool center point). Furthermore, thanks to suitable signal processing of the detected actual values I1, I2—for example a linear mixture of the detected actual values I1, I2—a virtual sensor can be simulated at a location that is not directly accessible. The effect of the active vibration damper 10 can also be optimized. Furthermore, the dual controller 14 can easily be kept stable, such that it thus for its part does not cause an unstable activation of the active vibration damper 10.

The present invention has been explained above in connection with a single active vibration damper 10 which is arranged on a single machine element 1—here the machine element 1d. It is however also possible for multiple active vibration dampers 10 to be arranged on a single machine element 1. It is also possible for one or more active vibration dampers 10 to be arranged on multiple machine elements 1 in each case.

Although the invention has been more fully illustrated and described in detail by the preferred exemplary embodiment, the invention is not restricted by the disclosed examples and other variations can be derived therefrom by the person skilled in the art, without departing from the scope of protection of the invention.

What is claimed is:

1. A machine tool, comprising:
 a plurality of machine elements;
 a plurality of drives operably connected to the machine elements in one-to-one correspondence for moving the machine elements relative to one another;
 a machine control unit configured to identify control signals for the drives and to output the control signals to the drives in order to move the machine elements relative to one another in a position-controlled manner, such that a tool which machines a workpiece is moved relative to the workpiece in a position-controlled manner;

an active vibration damper arranged in a first region of one of the machine elements in order to damp a vibration occurring during machining of the workpiece by the tool in a second region of the one of the machine elements;

a first sensor arranged in the first region of the one of the machine elements to detect the vibration to be damped in the second region of the one of the machine elements;

a second sensor arranged on another one of the machine elements or in another region of the one of the machine elements; and a dual controller receiving a first actual value detected by the first sensor, a second actual value detected by the second sensor, and first and second target values, said dual controller configured to Identify a resulting manipulated variable for the active vibration damper based on the detected first and second actual values and the first and second target values and to correspondingly activate the active vibration damper, said dual controller comprising a first controller to which the first target value and the first detected actual value are supplied and which identifies a first connection variable from the first target value and the first detected actual value, and a second controller to which the second target value, the second detected actual value, and the first connection variable are supplied and which identifies the resulting manipulated variable from the second target value, the second detected actual value, and the first connection variable.

2. The machine tool of claim 1, wherein the second sensor is arranged in the second region of the one of the machine elements.

3. The machine tool of claim 1, wherein the first target value has a value zero or has a value which is determined by target or actual values of the drives to move the machine elements relative to one another in the position-controlled manner and/or wherein the second target value has a value zero or has a value which is determined by target or actual values of the drives to move the machine elements relative to one another in the position-controlled manner.

4. The machine tool of claim 1, wherein the resulting manipulated variable of the dual controller is a target force.

5. The machine tool of claim 1, wherein the dual controller includes a pilot-control block to which the first target value and the first detected actual value are supplied and which identifies a second connection variable from the first target value and the first detected actual value, said second controller configured to identify a provisional manipulated variable from the second target value, the second detected actual value, and the first connection variable, wherein the dual controller connects the second connection variable to the provisional manipulated variable so as to identify the resulting manipulated variable.

* * * * *